United States Patent [19]

Patel et al.

[11] Patent Number: 4,976,972

[45] Date of Patent: Dec. 11, 1990

[54] CHEWING GUM WITH IMPROVED SWEETNESS EMPLOYING XYLITOL ROLLING COMPOUND

[75] Inventors: Mansukh M. Patel, Downers Grove; Paul R. Chisari, Chicago; Kevin B. Broderick, Berwyn, all of Ill.

[73] Assignee: Wm. Wrigley Jr. Company, Chicago, Ill.

[21] Appl. No.: 414,579

[22] Filed: Sep. 28, 1989

Related U.S. Application Data

[63] Continuation of Ser. No. 159,870, Feb. 24, 1988, abandoned.

[51] Int. Cl.$^5$ .............................................. A23G 3/30
[52] U.S. Cl. .......................................... 426/3; 426/96; 426/289; 426/295
[58] Field of Search ..................... 426/36, 96, 289, 295

[56] References Cited

U.S. PATENT DOCUMENTS

| | | |
|---|---|---|
| Re. 30,197 | 1/1980 | Klose . |
| 2,305,960 | 12/1942 | Frorer ................................. 426/5 |
| 3,296,079 | 1/1967 | Griffin ................................ 167/93 |
| 3,492,131 | 1/1970 | Schlatter ........................... 99/141 |
| 3,642,491 | 2/1972 | Schlatter ............................ 99/28 |
| 3,655,866 | 4/1972 | Bilotti ............................... 424/48 |
| 3,717,711 | 2/1973 | Miller .............................. 424/343 |
| 3,899,593 | 8/1975 | Hammond ........................... 426/3 |
| 3,914,434 | 10/1975 | Bohni .............................. 426/548 |
| 3,915,736 | 10/1975 | Oyamada .......................... 127/29 |
| 3,932,604 | 1/1976 | Barth ................................ 424/49 |
| 3,970,747 | 7/1976 | Barth ................................ 424/52 |
| 4,000,320 | 12/1976 | Klose ................................. 426/3 |
| 4,065,578 | 12/1977 | Reggio ............................. 426/548 |
| 4,097,616 | 6/1978 | Guillou ............................ 426/548 |
| 4,105,801 | 8/1978 | Dogliotti ........................... 426/99 |
| 4,122,205 | 10/1978 | Burge ............................... 426/548 |
| 4,127,677 | 1/1978 | Fronczkowski ..................... 426/5 |
| 4,134,999 | 1/1979 | Muhler ............................... 426/3 |
| 4,146,653 | 3/1979 | Mader ................................ 427/3 |
| 4,153,732 | 5/1979 | Muhler .............................. 426/72 |
| 4,161,544 | 7/1979 | Kaul .................................. 426/5 |
| 4,208,431 | 6/1980 | Friello ............................... 426/3 |
| 4,238,475 | 12/1980 | Witzel .............................. 424/48 |
| 4,238,510 | 12/1980 | Cherukuri .......................... 426/5 |
| 4,254,154 | 3/1981 | Eisenstadt ........................ 426/548 |
| 4,271,197 | 6/1981 | Hopkins ............................. 426/3 |
| 4,284,650 | 8/1981 | Goupil ................................ 426/5 |
| 4,291,017 | 9/1981 | Beierle .............................. 424/52 |
| 4,292,337 | 9/1981 | Andersen ......................... 426/573 |
| 4,359,531 | 11/1982 | Bucke ................................ 435/97 |
| 4,370,350 | 1/1983 | Fisher ................................ 426/5 |
| 4,374,858 | 2/1983 | Glass et al. ........................ 426/5 |
| 4,386,158 | 5/1983 | Shimizu ............................. 435/97 |
| 4,405,647 | 9/1983 | Fisher et al. ...................... 426/5 |
| 4,562,076 | 12/1985 | Arnold .............................. 426/5 |
| 4,590,075 | 5/1986 | Wei ................................... 426/5 |
| 4,681,766 | 7/1987 | Huzinec ............................. 426/5 |
| 4,695,326 | 9/1987 | Takazoe ........................... 127/30 |

FOREIGN PATENT DOCUMENTS

| | | |
|---|---|---|
| 0027024 | 4/1981 | European Pat. Off. . |
| 0229594 | 7/1987 | European Pat. Off. . |
| 2659424 | 7/1977 | Fed. Rep. of Germany . |
| 2334311 | 7/1977 | France . |
| 48-49962 | 7/1973 | Japan . |
| 56-25091 | 6/1981 | Japan . |
| 872848 | 11/1987 | South Africa . |
| 1401590 | 7/1975 | United Kingdom . |
| 1526020 | 9/1978 | United Kingdom . |
| 1532870 | 11/1978 | United Kingdom . |
| 1559989 | 1/1980 | United Kingdom . |
| 0009325 | 4/1980 | United Kingdom . |

OTHER PUBLICATIONS

*Canadian Institute of Food Service and Technology Journal,* vol. 18, No. 1 (1985), Properties of Xylitol, first page and page containing "Table 1. Properties of Some Natural Sugars and Sugar Alcohols".

J. N. Counsell, ed., Xylitol (Applied Science Publishers Ltd, London, 1978), pp. 4–7.

U. Manz et al., Xylitol–its Properties and Use as a Sugar Substitute in Foods (Reprint of Food R. A. Symposium "Sugar and Sugar Replacements" paper, London 1973), pages entitled Physical and Chemical Properties of Xylitol, and Table III, Moisture Pickup of Xylitol.

*Primary Examiner*—Jeanette Hunter
*Attorney, Agent, or Firm*—Willian Brinks Olds Hofer Gilson & Lione

[57] ABSTRACT

A chewing gum product in stick or sheet form is provided with a rolling compound of xylitol, preferably from about 0.5 to about 7 percent, and more preferably from about 2 to about 3 percent, by weight of the chewing gum product.

28 Claims, No Drawings

CHEWING GUM WITH IMPROVED SWEETNESS EMPLOYING XYLITOL ROLLING COMPOUND

CROSS-REFERENCE TO RELATED APPLICATION

This is a continuation of application Ser. No. 159,870 filed Feb. 24, 1988, and now abandoned.

BACKGROUND OF THE INVENTION

This invention relates to chewing gum. More particularly, it relates to chewing gum (especially sugarless gum) with improved sweetness, employing xylitol as a rolling or dusting compound.

For many years it has been known to dust products such as chewing gum with materials such as powdered sugar to improve appearance and initial taste. The dusting also is intended to prevent the chewing gum from sticking to the fingers when handled, or to the wrapper when the product is unwrapped. The material used to dust chewing gum is known as a dusting compound; or, because its primary function in gum is to make the gum more manageable during processing, including rolling, as a rolling compound.

Frorer, in U.S. Pat. No. 2,305,960, issued Dec. 22, 1942, discloses the use of mannitol crystals as a dusting compound for chewing gum and other products, to retain its appearance, palatableness and resistance to stickiness in humid weather. The chewing gum is dusted over its entire exterior surface with mannitol crystals, and the dusted sheets are cut and wrapped. Application can also be made by dipping the gum in the mannitol crystals, or by sprinkling the mannitol crystals on the gum.

Other conventional known rolling compounds include sucrose, sorbitol, starch calcium carbonate and talc. Sucrose is a sugar, and by definition, cannot be used in a sugarless gum. Mannitol is today the most common sugarless rolling compound but it does not enhance initial sweetness of the chewing gum. Sorbitol can cause a burning sensation in the throat. Starch can give a dry mouth feel and can cause embrittlement of the gum by drawing water out of the gum stick. Calcium carbonate and talc likewise do not enhance taste.

Arnold et al., in U.S. Pat. No. 4,562,076, issued Dec. 31, 1985, disclose the application of thaumatin or monellin, alone or in combination with other known rolling compounds, to the surface of chewing gum, as high-potency flavor and sweetness enhancers.

Fronczkowski et al., in U.S. Pat. No. 4,127,677, issued Nov. 28, 1978, disclose a xylitol-coated chewing gum, made by applying a coating syrup of 55–70 percent solids, of which solids 95–99.5 percent is xylitol. No dusting or rolling compounds are mentioned, and in fact, the gum centers are dedusted before applying the coating syrup. The amount of coating is not explicitly stated, but the coating solution is said to be sprayed onto gum centers "until the desired weight or gauge is reached". Sufficient coating is applied to allow polishing, and a smooth, bright white coating, substantially free of imperfections, is obtained (col. 4, lines 26–31 and 56–58). In distinction to the present invention, moreover, the xylitol of the Fronczkowski et al, gum product is not present in particulate form, but rather as a coherent coating which has been dried from a syrup.

Hammond et al., in U.S. Pat. No. 3,899,593, issued Aug. 12, 1975, disclose a chewing gum composition containing a major amount of xylitol. The composition of U.S. Pat. No. 3,899,593 requires from about 2 to about 6% by weight of glycerol, "in order to soften the gum base to the extent that the base will be capable of binding the crystalline material," (col. 1, lines 64–65 and col. 2, lines 19–21).

Reggio et al., in U.S. Pat. No. 4,065,578, issued Dec. 27, 1977, disclose a chewing gum composition wherein xylitol is used as a major bulking sweetening agent, and a hydrocolloid is used as a binder between the gum base and xylitol. The hydrocolloid also serves as a humectant to hold moisture in the gum (col. 1, lines 27–32). Both U.S. Pat. Nos. 3,899,593 and 4,065,578 teach that a binder is necessary to produce a gum product with xylitol as the major bulking agent.

Klose et al., in U.S. Pat. No. 4,000,320, issued Dec. 28, 1976, and reissued Jan. 22, 1980 as U.S. Reissue Pat. No. Re. No. 30,197, disclose a chewing gum composition containing less than 50% xylitol; and as stated in the Examples and in the Reissue Patent at col. 1, line 68—col. 2, line 2, preferably less than 10% by weight, especially from 1 to 3.2% by weight. Klose et al. use xylitol to extend the storage stability of the gum, by enabling the gum to retain more moisture when the gum is stored at low relative humidities (col. 2, lines 51–57; reissue at col. 2, lines 64–67).

Bohni, in U.S. Pat. No. 3,914,434, issued Oct. 1, 1975, discloses the use of xylitol as a non-cariogenic sugar substitute.

Glass et al., in U.S. Pat. No. 4,374,858, issued Feb. 22, 1983, disclose a rolling compound comprising aspartame for stabilizing aspartame in gum.

SUMMARY OF THE INVENTION

According to the present invention, there is provided a chewing gum product, having a core portion comprising chewable gum base, sweetener and flavoring, and further having deposited on the surface of said the core portion, a rolling compound comprising powdered xylitol, the xylitol preferably constituting from about 0.5 to about 7, more preferably from about 2 to about 3, percent by weight of the chewing product. The xylitol is preferably applied to the chewing gum after extrusion, prior to sizing, at a level of from about 9 to about 126 preferably from about 36 to about 55, grams per square meter of gum; of which half is applied to each side of the gum.

DETAILED DISCLOSURE

The chewing gum product of the present invention utilizes conventional chewing gum compositions for the core portion of the chewing gum product.

In general, a chewing gum composition typically comprises a water soluble bulk portion and a water insoluble chewable gum base portion and, typically water insoluble flavoring agents. The water soluble portion dissipates with a portion of the flavoring agent over a period of time during chewing. The gum base portion is retained in the mouth throughout the chew.

The insoluble gum base generally comprises elastomers resins, fats and oils, waxes, softeners and inorganic fillers. Elastomers may include polyisobutylene, isobutylene-isoprene copolymer, styrene butadiene rubber as well as natural latexes such as chicle. Resins include polyvinylacetate and terpene resins. Fats and oils may also be included in the gum base, including tallow, hydrogenated and partially hydrogenated vegetable oils, and cocoa butter.

Commonly employed waxes include paraffin, microcrystalline and natural waxes such as beeswax and carnauba. According to the preferred embodiment of the present invention the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically also includes a filler component. The filler component such as calcium carbonate, magnesium carbonate, talc, dicalcium phosphate and the like. The filler may constitute between about 5 to about 60 percent by weight of the gum base. Preferably, the filler comprises about 10 to about 50 percent by weight of the gum base.

Gum bases typically also contain softeners, including glycerol monostearate and glycerol triacetate. Further gum bases may also contain optional ingredients such as antioxidants, colors and emulsifiers. The present invention contemplates employing any commercially acceptable gum base.

The water soluble portion comprises primarily sweet bulking agents which are powdered sugars or sugar alcohols such as sucrose, glucose, dextrose, fructose, lactose, sorbitol mannitol, xylitol, and the like.

The water soluble portion of the chewing gum may further comprise softeners sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in gum.

The present invention will most likely use sugarless gum formulations. However, formulations containing sugar are also within the scope of the invention. Sugar sweeteners generally include saccharide components commonly known in the chewing gum art which comprise but are not limited to sucrose, dextrose, maltose, dextrin, dried invert sugar, fructose, levulose, galactose, corn syrup solids, and the like, alone or in any combination. Sugarless sweeteners include components with sweetening characteristics but are devoid of the commonly known sugars. Sugarless sweeteners may comprise sugar alcohols such as sorbitol, mannitol, xylitol, hydrogenated starch hydrolysates, maltitol, and the like, alone or in any combination. The sugar alcohols function not only as sweeteners for sugarless gums but as bulking agents, i.e., a water-soluble component of the gum base which provides bulk. A preferred sugarless sweetener which does not function as a bulking agent, and may be used in the core portion or in the rolling compound, is the dipeptide sweetener aspartame (L-aspartyl-L-phenylalanine methyl ester, disclosed in U.S. Pat. Nos. 3,492,131, issued Jan. 27, 1970, to Schlatter, and 3,642,491, issued Feb. 15, 1972, to Schlatter) in an amount of about 0.025 percent to about 0.5 percent, but preferably about 0.3 percent, by weight of the chewing gum product. A natural high-potency sweetener with flavor enhancing properties, which may likewise be used either in the core portion or in the rolling compound, is glycyrrhizin.

A flavoring agent may be present in the chewing gum in an amount within the range of from about 0.1 to about 10.0 weight percent of the gum. The flavoring agents may comprise essential oils, synthetic flavors, or mixture thereof including but not limited to oils derived from plants and fruits such as citrus oils, fruit essences, peppermint oil, spearmint oil, clove oil, oil of wintergreen, anise, and the like. Artificial flavoring components are also contemplated. Those skilled in the art will recognize that natural and artificial flavoring agents may be in any sensorally acceptable blend. All such flavors and flavor blends are contemplated by the present invention.

Optional ingredients such as colors, emulsifiers and pharmaceutical agents may be added to the chewing gum.

In general, chewing gum is manufactured using the well-known method of sequentially combining the various chewing gum ingredients in a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time along with syrup and a portion of bulking agent. Further portions of the bulking agent may then be added to the mixer. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

The present invention is characterized by the use of a rolling compound which comprises particulate xylitol. Xylitol is a pentahydric alcohol having the formula

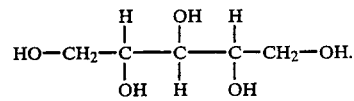

Xylitol is a crystalline compound. Its stable solid form melts at 93°–94.5° C.; the metastable form melts at 61°–61.5° C. The solubility in water of the stable form is 64.2 grams per 100 grams of solution at room temperature. Its relative sweetness is about 90 percent of that of sucrose. It is readily digested and is easily metabolized by diabetics. It is commonly used as an oral and intravenous nutrient, as a dietary additive, and in anticaries preparations.

The xylitol of the rolling compound preferably constitutes from about 0.5 to about 7, more preferably from about 2 to about 3, percent by weight of the chewing gum product. Surprisingly, this small amount of xylitol, when used in this manner, significantly enhances the initial sweetness and flavor perception of the gum. The xylitol should have a size of from about 74 to about 177 microns (200 mesh to 80 mesh, U.S. Sieve Series), preferably from about 88 to about 149 microns (170 mesh to 100 mesh, U.S. Sieve Series).

The rolling compound may consist essentially of xylitol, or it may contain one or more anti-caking agents, flavors, colors, bulking agents or other sweeteners. Preferably, the rolling compound comprises at least 80% xylitol, but it may comprise as little as 50% xylitol, or less.

One problem with the use of xylitol as a rolling compound is its tendency to cake and form lumps. One way to deal with the caking problem is to include in the rolling compound an anti-caking agent. The rolling compound preferably contains from about 0.1 to about 20.0 percent by weight of the rolling compound of at least one anti-caking agent, for example, a member of the group consisting of fumed or precipitated silica, talc, starch, calcium carbonate, calcium phosphate and magnesium stearate, and mixtures thereof. These anti-caking agents vary greatly in effectiveness, and in the maximum amount which may be used without affecting the taste of the gum. The amount of anti-caking agent to be used is an amount sufficient to be effective, yet low enough not to affect the taste of the gum. Anti-caking agents which may be used in the amount of from about 0.1 to about 2.0 percent by weight of the rolling compound include magnesium stearate, fumed silica, precipitated silica, calcium phosphate and starch. The preferred anti-caking agent is a combination of fumed silica, which is preferably present in an amount of about 0.5 percent by weight of the rolling compound, and talc, which is preferably present in an amount of about 10 percent by weight of the rolling compound.

Various combinations of anti-caking agents were tested for flowability. A good anti-caking agent will result in a good flowability, which is most easily measured by the angle of repose of the mixture. A large angle of repose indicates low flowability and is undesirable; a small angle of repose indicates high flowability and is desirable. Angles of repose greater than 45° are regarded as indicating poor flowability; 35°–45°, fair; 30°–34°, good; and less than 30°, excellent. The components (in percent by weight) of the compositions tested, and the angles of repose found, were as follows:

| INGREDIENT | COMPOSITION | | | | |
| --- | --- | --- | --- | --- | --- |
| | A | B | C | D | E |
| Xylitol | 91 | 88 | 86 | 98 | 87.9 |
| Talc | 7 | 10 | 12 | — | 10 |
| Flavor | 2 | 2 | 2 | 2 | 2 |
| Fumed Silica | — | — | — | — | 0.1 |
| Mannitol | — | — | — | — | — |
| Total | 100 | 100 | 100 | 100 | 100 |
| Angle of Repose | 49.6° | 46.7° | 36.9° | >75° | 27.0° |

| INGREDIENT | COMPOSITION | | | | |
| --- | --- | --- | --- | --- | --- |
| | F | G | H | I | J |
| Xylitol | 87.5 | 87.0 | 83 | 78 | 73 |
| Talc | 10 | 10 | 10 | 10 | 10 |
| Flavor | 2 | 2 | 2 | 2 | 2 |
| Fumed Silica | 0.5 | 1.0 | — | — | — |
| Mannitol | — | — | 5 | 10 | 15 |
| Total | 100 | 100 | 100 | 100 | 100 |
| Angle of Repose | 21.9° | 32.9° | 33.6° | 34.8° | 33.2° |

The combination of 10 percent talc and 0.5 percent fumed silica, Composition E, proved to be the most flowable and most effective combination tested.

If an anti-caking compound is used, it is preferably incorporated in the the rolling compound by dry blending, for example, in a twin shell blender or fluidized bed, prior to application of the rolling compound to the chewing gum.

Another way to deal with the caking problem is to grind the rolling compound, either alone or in combination with anti-caking agents. Grinding may be accomplished by jet milling, turbo milling, hammer milling, ball milling, roller crushing, or any other suitable method. Such grinding should be done just prior to use of the rolling compound to minimize recaking, at most four days before use.

The rolling compound may also comprise up to about 10 percent by weight of the rolling compound, preferably up to about 3.0 percent by weight of the rolling compound and more preferably up to about 1.0 percent, of at least one member of the group consisting of flavors, colors and high intensity sweeteners. A preferred sweetener is from about 0.025 to about 0.5 percent of aspartame, by weight of the chewing gum product. If the rolling compound is used as a carrier for liquid flavor, it is blended into the rolling compound after the addition of the anti-caking agents (if used), for example, in a twin shell blender or fluidized bed.

In order to reduce the cost of the chewing gum products, the rolling compound may also comprise up to about 20 percent by weight of the rolling compound of a bulking agent, for example one selected from the group consisting of one or more sugar alcohols selected from the group consisting of sorbitol, mannitol, hydrogenated isomaltulose, and mixtures thereof; and one or more sugars selected from the group consisting of sucrose, glucose, dextrose, fructose, lactose, palatinose and mixtures thereof. Other bulking agents which can be used include talc, starch, dextrin and maltodextrin. Many others may also be used. Some materials, such as talc starch and calcium carbonate function both as anti-caking agents and as bulking agents.

Higher levels of bulking agents may be used in the rolling compound, up to about 50% by weight of the rolling compound, but the benefits of the present invention will be correspondingly reduced.

After the gum is mixed, it is shaped and processed into individual pieces. In the case of gum intended to be sold in stick or tab form, the gum is typically formed into sheets, dusted with rolling compound, rolled, and cut into individual sticks or tabs. In the case of gum intended to be sold in chunk form, rolling is not necessary. Although the rolling compound of the present invention is most useful for gum which is rolled and is to be sold in stick or tab form, it may also be used for gum which is not rolled, and is to be sold in other forms, such as chunks.

The rolling compound is used by applying it to the surface of each side of the gum product, prior to rolling if the product is rolled. The xylitol of the rolling compound preferably constitutes from about 0.5 to about 7, more preferably from about 2 to about 3, percent by weight of the chewing gum product. For a typical gum intended for sale in stick form which weighs on the order of 1880 grams per square meter, this translates to an application of from about 9 to about 126 grams of xylitol per square meter of the gum, preferably from about 36 to about 54 grams of xylitol per square meter of gum. Of this amount, half is applied to each side of the gum, i.e., from about 4.5 to about 63 grams, preferably from about 18 to about 27 grams, per square meter of surface area of the gum. The xylitol is preferably applied to the chewing gum after extrusion, prior to sizing, by dusting the rolling compound onto the surface of the chewing gum product.

The invention will now be illustrated with an Example.

EXAMPLE

A sugarless cinnamon gum uses the following ingredients in the core portions:

|  | Percent By Weight |
|---|---|
| Sorbitol | 52.8 |
| Gum Base | 25.0 |
| Glycerin | 12.6 |
| Mannitol | 4.0 |
| Talc | 3.0 |
| Cinnamon Flavor | 1.8 |
| Color | 0.5 |
| Aspartame | 0.3 |
|  | 100.0 |

Rolling compounds suitable for use with the above core composition use the following ingredients:

|  | Percent By Weight: | |
|---|---|---|
|  | K | L |
| Xylitol | 89.1 | 88.8 |
| Talc | 10.0 | 10.0 |
| Fumed Silica | 0.5 | 0.5 |
| Cinnamon Flavor | 0.4 | 0.6 |
| Glycyrrhizin | — | 0.1 |
|  | 100.0 | 100.0 |

Composition "L" is the preferred rolling compound.

Although the present invention has been described in connection with specific embodiments, it will be recognized that numerous modifications both in the selection of the gum ingredients and in their amounts may be made without departing from the scope of the invention.

We claim:

1. A sheeted chewing gum product in stick or tab form, having a core portion comprising chewable gum base, sweetener and flavoring, and further having deposited on the surface of said the core portion, a powdered rolling compound containing at least 80 percent of xylitol, said rolling compound comprising from about 0.5 to about 7 percent by weight of the chewing gum product.

2. The chewing gum product of claim 1, wherein the xylitol constitutes from about 2 to about 3 percent by weight of the chewing gum product.

3. The chewing gum product of claim 1, wherein the xylitol has a size of from about 74 to about 177 microns.

4. The chewing gum product of claim 1, wherein the xylitol has a size of from about 88 to about 149 microns.

5. The chewing gum product of claim 1, wherein the rolling compound consists essentially of xylitol.

6. The chewing gum product of claim 1, wherein the rolling compound comprises at least 80 percent by weight of xylitol.

7. The chewing gum product of claim 1, wherein the rolling compound comprises at least 50 percent by weight of xylitol.

8. The chewing gum product of claim 1, wherein the rolling compound comprises from about 0.1 to about 20.0 percent by weight of the rolling compound of at least one anti-caking agent of the group consisting of fumed or precipitated silica, talc, starch, calcium carbonate, calcium phosphate and magnesium stearate.

9. The chewing gum product of claim 8, wherein the rolling compound comprises a combination of fumed silica and talc.

10. The chewing gum product of claim 9, wherein the rolling compound comprises about 0.5 percent by weight of the rolling compound of fumed silica and about 10.0 percent by weight of the rolling compound of talc.

11. The chewing gum product of claim 1, wherein the rolling compound comprises up to about 10 percent by weight of the rolling compound of at least one member of the group consisting of flavors, colors and high intensity sweeteners.

12. The chewing gum product of claim 11, wherein the rolling compound comprises up to about 3.0 percent by weight of the rolling compound of at least one member of the group consisting of flavors, colors and high intensity sweeteners.

13. The chewing gum product of claim 11, wherein the rolling compound comprises up to about 1.0 percent by weight of the rolling compound of at least one member of the group consisting of flavors, colors and high intensity sweeteners.

14. The chewing gum product of claim 11, wherein the rolling compound comprises from about 0.025 to about 0.5 percent of aspartame, by weight of the chewing gum product.

15. The chewing gum product of claim 1, wherein the rolling compound comprises up to about 50 percent by weight of the rolling compound of a bulking agent selected from the group consisting of sorbitol, mannitol, sucrose, glucose, dextrose, fructose, lactose, talc, starch, dextrin, maltodextrin, hydrogenated isomaltulose, palatinose and mixtures thereof.

16. The chewing gum product of claim 1, wherein the rolling compound comprises up to about 20 percent by weight of the rolling compound of a bulking agent selected from the group consisting of sorbitol, mannitol, sucrose, glucose, dextrose, fructose, lactose, talc, starch, dextrin, maltodextrin, hydrogenated isomaltulose, palatinose and mixtures thereof.

17. A method of sweetening a sheeted chewing gum product in stick or tab form comprising chewable gum base and flavoring, the method comprising the step of applying, to the surface of each side of the gum product, a powdered rolling compound containing at least 80 percent of xylitol, said rolling compound comprising from about 0.5 to about 7 percent by weight of the chewing gum product.

18. The method of claim 17, wherein the rolling compound is applied to the chewing gum at a level of from about 4.5 to about 63 grams of xylitol per square meter of the surface area of the gum.

19. The method of claim 17, wherein the rolling compound is applied to the chewing gum at a level of from about 18 to about 27 grams of xylitol per square meter of the surface area of the gum.

20. The method of claim 17, comprising the steps of sequentially
   (a) extruding the chewing gum;
   (b) applying the rolling compound to the chewing gum; and
   (c) sizing the chewing gum.

21. The method of claim 17, wherein the rolling compound is applied by dusting the rolling compound onto the surface of the chewing gum product.

22. The method of claim 17, comprising the steps of blending from about 0.1 to about 20.0 percent by weight of the rolling compound of at least one anti-caking agent of the group consisting of fumed or precipitated silica, talc, starch, calcium carbonate, calcium phosphate and magnesium stearate, into the xylitol; and subsequently applying the rolling compound to the chewing gum.

23. The method of claim 17, comprising the steps of blending up to about 10 percent by weight of the rolling compound of at least one member of the group consisting of flavors, colors and high intensity sweeteners, into the xylitol; and subsequently applying the rolling compound to the chewing gum.

24. The method of claim 22, comprising the steps of blending up to about 3.0 percent by weight of the rolling compound of at least one member of the group consisting of flavors, colors and high intensity sweeteners, into the mixture of anti-caking agent and xylitol; and subsequently applying the rolling compound to the chewing gum.

25. The method of claim 22, comprising the steps of blending up to about 1.0 percent by weight of the rolling compound of at least one member of the group consisting of flavors, colors and high intensity sweeteners, into the mixture of anti-caking agent and xylitol; and subsequently applying the rolling compound to the chewing gum.

26. A method according to one of claims 22-25, wherein the blending is in a twin shell blender.

27. A method according to one of claims 22-25, wherein the blending is in a fluidized bed.

28. A method according to one of claims 17, 22 or 24, comprising the step of grinding the rolling compound within 4 days prior to application of the rolling compound to the chewing gum.

* * * * *

UNITED STATES PATENT AND TRADEMARK OFFICE
CERTIFICATE OF CORRECTION

PATENT NO. : 4,976,972
DATED : December 11, 1990
INVENTOR(S) : Mansukh M. Patel et al.

Page 1 of 2

It is certified that error appears in the above-identified patent and that said Letters Patent is hereby corrected as shown below:

In column 1, line 25, please delete "2,305,960" and substitute therefor --2,305,960--.

In column 1, line 36, after "starch" please insert --,--.

In column 2, line 26, please delete "Oct. 1, 1975" and substitute therefor --Oct. 21, 1975--.

In column 2, line 43, after "126" please insert --,--.

In column 3, lines 10 and 11, please delete "component. The filler".

In column 3, line 26, after "sorbitol" please insert --,--.

In column 3, line 28, after "softeners" please insert --,--.

In column 5, line 67, please delete the first occurrence of "the".

UNITED STATES PATENT AND TRADEMARK OFFICE
CERTIFICATE OF CORRECTION

PATENT NO. : 4,976,972

DATED : December 11, 1990

INVENTOR(S) : Mansukh M. Patel et al.

Page 2 of 2

It is certified that error appears in the above-identified patent and that said Letters Patent is hereby corrected as shown below:

In column 6, line 35, after "talc" please insert --,--.

In claim 1, line 4, please delete "said".

Signed and Sealed this

Tenth Day of November, 1992

*Attest:*

DOUGLAS B. COMER

*Attesting Officer*     *Acting Commissioner of Patents and Trademarks*